March 12, 1968     C. W. HEWLETT, JR     3,373,268
PROCESS CONTROLLER HAVING ELECTROCHEMICAL
CELL INTEGRATING MEANS
Filed Feb. 24, 1964
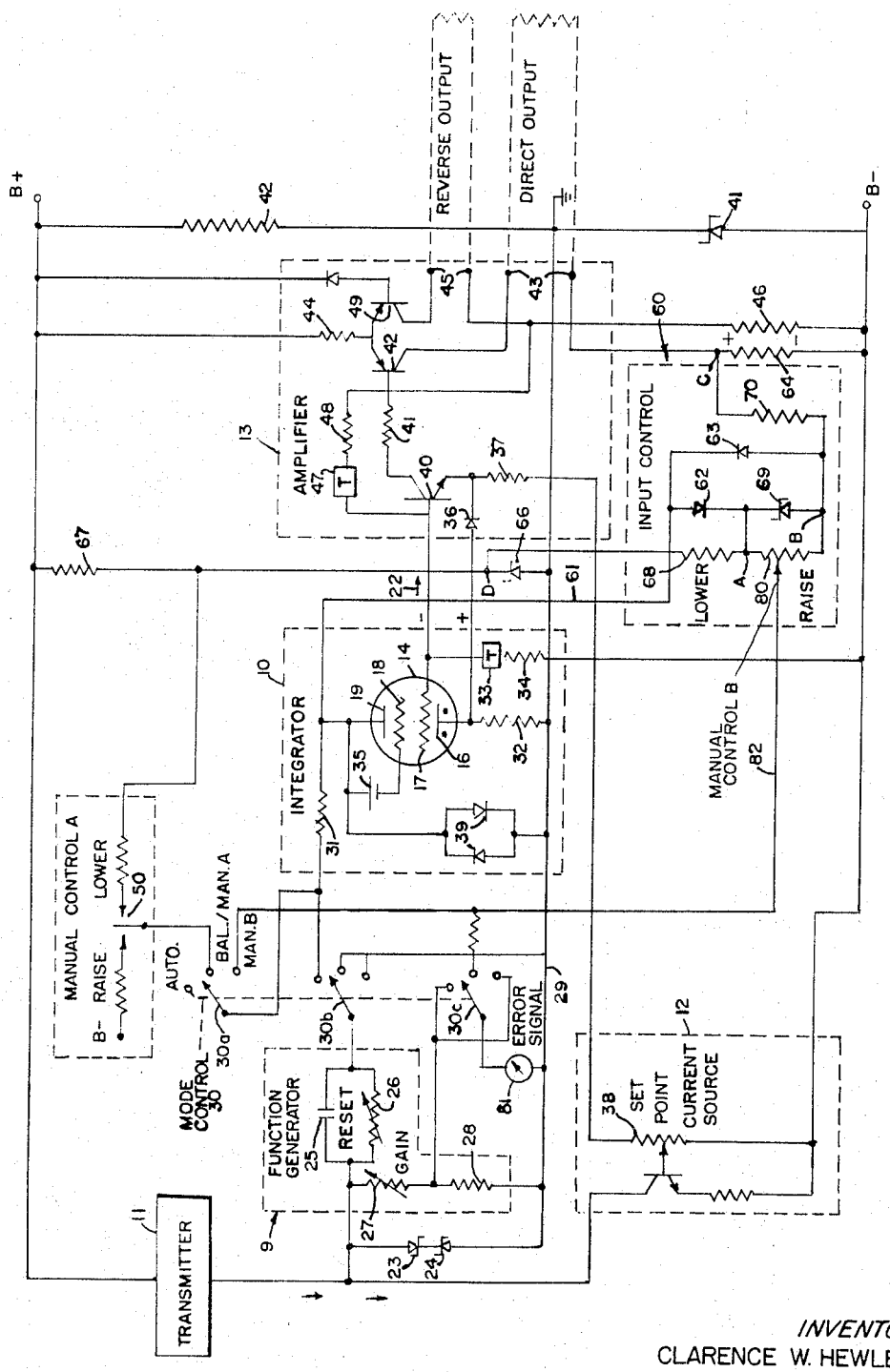
INVENTOR
CLARENCE W. HEWLETT JR.
BY W. J. Shanley Jr.
ATTORNEY

United States Patent Office 3,373,268
Patented Mar. 12, 1968

3,373,268
PROCESS CONTROLLER HAVING ELECTRO-
CHEMICAL CELL INTEGRATING MEANS
Clarence W. Hewlett, Jr., Hampton, N.H., assignor to
General Electric Company, a corporation of New
York
Filed Feb. 24, 1964, Ser. No. 346,991
12 Claims. (Cl. 235—151.1)

ABSTRACT OF THE DISCLOSURE

A process controller having an electrochemical cell integrating means. An error signal is connected to a derivative function generating circuit the output of which is coupled to the input of an electrochemical cell integrating circuit. The integral output signal is then coupled through an amplifier to control a process load.

Background of the invention

This invention relates to process controllers, and more particularly to process controllers of the type utilizing an electrochemical integrating device.

Commonly, process controllers utilize what may be termed as the "derivation followed by integration" technique for obtaining a proportional response. This technique involves the application of the input error signal to a network capable of generating a derivative function and then applying the resultant signal to the input of a network which is capable of integrating the signal.

As is well known in the art, the derivative function is very simply obtained by providing a series capacitor between the error signal source and the input of the integrating network. However, the integrating network conventionally utilized in prior art controllers is normally comprised of a rather elaborate and expensive D-C amplifier which performs the integrating function by having its output capacitively coupled back to its input. These amplifiers are, of necessity, very expensive because of stringent gain and stability requirements and because of the additional requirement that its input impedance be sufficiently high to prevent the input circuit of the amplifier from loading down the capacitor of the feedback network so as to interfere with its integrating function.

Quite commonly, amplifier input impedances of the order of 10 megohms and higher have been found to be necessary to adequately perform the required integration function. A common type of amplifier presently being utilized comprises a chopper followed by a plurality of stages of A-C amplification, a demodulator, a D-C amplifier for generating the required feedback voltage, and a second chopper and demodulator for isolating the D-C output from the feedback circuit. In addition, a chopper frequency source and all of the attendant power supplies for such a system are also required. As can be seen, such an amplifier would be costly and complex.

It is therefore an object of this invention to provide a new and more simplified process controlled by eliminating the necessity for expensive, high-input impedance D-C amplifiers.

It is another object of this invention to provide a process controller in which the integration function is obtained without requiring D-C amplification.

It is yet another object of this invention to provide a process controller in which the integration function is accomplished by an electrochemical device that provides an electrical output signal proportional to the integral of the signals applied to the input.

It is a further object of this invention to provide a process controller in which a D-C signal proportional to the input error signal is obtained prior to any D-C amplification in the controller.

It is still a further object of this invention to provide a process controller capable of automatic and manual control in which the transfer from automatic to manual modes of operation is inherently self-synchronized.

It is another object of this invention to provide a low-cost controller of great simplicity by utilizing an an electrochemical integrating device having a low-input impedance in cooperation with an error signal source which generates a current equal to the difference between the measured variable and the set point.

Summary

In accordance with one aspect of this invention, an error signal representing the difference between a measured process variable and a set point signal is applied to a function generator which operates on the error signal to produce an output signal which is a function of the derivative of the error signal. This output signal from the function generator is then coupled to an integrator circuit comprising an electrochemical cell integrating device; and the output signal, which is proportional to the integral of the derivative function signal, is applied through amplifier means to a process load.

These and other objects and advantages of the invention may best be understood by reference to the following description taken in conjunction with the accompanying drawing in which:

Brief description of the drawings

The figure is a schematic representation of the preferred embodiment of this invention.

Description of the preferred embodiment

Referring now to the drawing, there is illustrated the basic form of the invention in which electrical readout INTEGRATOR 10 cooperates with FUNCTION GENERATOR 9, TRANSMITTER 11, SET POINT CURRENT SOURCE 12, and AMPLIFIER 13 to develop a D-C output current which is related to the magnitude of the difference current applied to FUNCTION GENERATOR 9.

INTEGRATOR 10 is comprised of an electrochemical integrating device which is capable of being electrically read out. These types of devices, which have become known as solions, are four electrode cells which contain an electrolyte for permitting the passage of a current to be integrated between an input electrode and a common electrode.

The electrolytic solution utilized in a solion is a solution of a reversible redox system; i.e., a system in which the ionic conduction between two electrodes results in the reduction of one species of the ions in solution at one of the electrodes and the corresponding oxidation of the other species of the ion at the other electrode of the system so that there is no net change in contents of the cell.

When solions are utilized as a current integrating device, the passage of current between the input and common electrodes changes the quantity of concentration of what has been called the ions of the measured species in the integral compartment. The readout electrode, which is located to define the integral compartment along with the common electrode, is utilized to indicate the concentration of the measured species in the integral compartment by permitting the passage of the readout current between the readout and common electrodes. The magnitude of the resulting readout current indicates the concentration of the measured species in the integral compartment which is in turn proportional to the charge transferred between the input and common electrodes. Thus, the solion performs the desired integration function.

Solion 14 is illustrated as comprising a cell containing an electrolyte in which there is immersed a common electrode 16, a readout electrode 17, a shield electrode 18, and an input electrode 19. These electrodes are formed of a metal which is inert in the electrolyte. For example, platinum electrodes have been commonly used with an electrolyte formed of an aqueous solution containing a small amount of iodine and a comparatively large amount of potassium or sodium-iodide. This results in a solution containing iodide-ions and tri-iodide ions, the latter of which will hereinafter be referred to as iodine. In such a redox system, iodine becomes the measured species of the ions of the solution. In this type of system, the concentration decreases when the input electrode is positive with respect to the common electrode while the opposite is true when the input electrode goes negative.

Further information concerning the manner of construction or theory of operation of solion 14 is not felt to be necessary for a complete understanding of the invention. It suffices here to say that solion 14 will provide an output current which flows in the direction indicated by arrow 22 between readout electrode 17 and common electrode 16 and is proportional to the integral of the current passed between input electrode 19 and common electrode 16.

Means is provided for obtaining an error current proportional to the difference between the current flowing in TRANSMITTER 11 and the current of SET POINT CURRENT SOURCE 12 by connecting these current sources in series between B+ and B— so that their current flow in the indicated direction. The difference current is thus applied to the input of FUNCTION GENERATOR 9 which is connected to a point common to both current sources. Zener diodes 23 and 24, which are connected in shunt with the input of FUNCTION GENERATOR 9, provide means for limiting to a given value the positive and negative excursions of the voltage on the input of FUNCTION GENERATOR 9. For reasons which will become apparent as this description proceeds, the novel cooperation between the difference current source and the limiting diodes permits the direct application of the difference current to INTEGRATOR without necessitating any preamplification because of the high inherent sensitivity of this configuration.

Capacitor 25 of FUNCTION GENERATOR 9 provides means for generating a derivative function of the arror signal since it is in series with the signal path. Reset action is provided in a conventional manner due to the presence of variable resistance 26 in parallel with capacitor 25 while proportional band control; i.e., the gain of the controller, is obtained by connecting variable resistance 27 and resistor 28 in shunt with the input of FUNCTION GENERATOR 9.

MODE CONTROL switch 30, which is comprised of three sections, 30a, 30b, and 30c, is selectively operable to three different positions for controlling the mode of operation of the controller. Assuming that switch 30 is in its AUTOMATIC position, the output current of FUNCTION GENERATOR 9 is coupled to input electrode 19 and common electrode 16 by switch section 30b, conductor 29, and resistors 31 and 32. Resistor 31 provides means to limit, in cooperation with Zener diodes 23 and 24, the magnitude of the current applied to the input circuit of solion 14. This is necessary to assure proper controller operation since there is a limitation upon the magnitude of the input current which a solion can accept without exhibiting a phenomenon which results in a momentary spurious surge of its readout current. This type of surge is highly detrimental to proper controller action since it results in the readout current moving in exactly the opposite direction from the direction that it should move. For example, the current increases in magnitude when it should be decreasing. The manner in which this surge is conducted from input to readout electrode is not fully understood, but it acts as if it were the result of a capacitive coupling of the signal from input electrode 19 to readout electrode 17.

It has been found that this limitation is directly related to the value of the readout current flowing at that time since the larger the readout current, the larger the input current that the solion can accept before a surge current appears. Thus, to permit the application of larger input currents, it is necessary to increase the readout current by adding a fixed current. Negative temperature coefficient resistance 33 and resistor 34, which are connected between readout electrode 17 and B—, provide means for applying a temperature-compensated bias current to common electrode 16 and readout electrode 17.

As is well known in the prior art, the electrochemical redox system of a solion must be completely reversible in order for it to accurately perform its integrating function. This will obtain as long as the applied voltages stay below the potential at which other ions enter into the reaction at the electrodes. Furthermore, such reactions must be avoided to prevent the generation of a gaseous by-product, the pressure of which would destroy the cell. This requires the selection of proper bias voltages and the limiting of the magnitude of the voltages applied to the solion.

The bias voltage requirements of solion 14 require the shield and readout electrodes to be negatively biased like amounts with respect to the input and common electrodes, respectively. Bias battery 35 provides means for negatively biasing shield electrode 18 with respect to input electrode 19, while means is provided by the drop across diode 36 to fix the operating point of readout electrode 17 so that it is negative a corresponding amount with respect to common electrode 16. This is accomplished by connecting diode 36 in the bleeder network which includes resistors 32 and 37 and potentiometer 38. The voltage developed across diode 36 is applied across the base-emitter junction of transistor 40 and the output circuit of solion 14 to provide the required net bias for readout electrode 17. Bias voltages of —.3 v. have been found to provide proper bias for shield electrode 18 and readout electrode 17.

Diodes 39 provide means for limiting the magnitude of the voltage appearing between input electrode 19 and common electrode 16 to protect the solion from inadvertent application of voltages which might destroy the cell. These diodes, which are in the nature of back-up protectors for solion 14, are designed to limit the voltage applied to input electrode 19 to ±.6 volt to prevent damage to the solion due to other ions entering into the reaction at the electrodes.

In accordance with my invention, the controller may be powered by a battery which is connected between terminals B+ and B—. Zener diode 41 and resistor 42, which are series connected between these terminals, respectively, provide a regulated B— potential and a less stringently controlled B+ supply. A 41 volt battery has been found to conveniently provide a 10 v. B— potential and a 31 v. B+ potential when utilizing a 10 v. Zener diode for diode 41.

It can be seen that the regulated B— potential appearing across Zener diode 41 is applied across the bleeder network which includes set point control potentiometer 38 and diode 36. Thus, any variations in battery potential will appear as variations in B+ potential, while B— will remain constant. Consequently, the set point current provided by source 12 and the bias on readout electrode 17 will be free from variations attributable to supply voltage variations.

Assuming that a 10–50 ma. process load current is desired at the output of AMPLIFIER 13, SET POINT CURRENT SOURCE 12 should also be capable of selectively providing a set point current falling at any point within this range of current values. Transmitter 11 also provides an output current signal varying in magnitude in accordance with the measured variable and lying within this range. It can be seen that when the currents from these two sources are equal no error current will be generated at the input of FUNCTION GENERATOR 9. If, however, these currents are not equal, a signal equal to their difference will be generated. It will be recognized that with the assumed range of current values the error current can reach a maximum magnitude of 40 ma. Zener diodes 23 and 24, as well as limiting resistor 31, are utilized to prevent signals of this magnitude from being applied to the input of the solion since solions in general usage are normally capable of handling only a few milliamperes.

It has been found that the maximum input current which can be applied to input electrode 19 at any given time is of the order of twice the value of readout current passing between readout electrode 17 and common electrode 16 at that time. It can thus be seen that the most rigorous condition which could be faced would occur when the readout current is at its minimum value and a large positive error signal is applied to the input of solion 14. This condition can arise when the set point is rapidly changed from its setting calling for a 50 ma. current in the DIRECT OUTPUT circuit to the setting calling for 10 ma. current.

This results in the addition of a large error current to input electrode 19 which causes the readout current to rapidly decrease in value. If, however, this readout current assumes its minimum value before the measured variable current correspondingly decreases, a large error current will continue to be applied to the input circuit of the solion. It can thus be seen that the component values for diodes 23 and 24 and resistor 31 must be chosen so that the maximum current applied to input electrode under these conditions is limited to a value of the order of twice the value of the minimum readout current. It has been found that with a minimum readout current of .5 milliampere, established by the fixed bias current, input currents of 1.2 ma. can be easily accommodated without a surge current appearing at readout electrode 17. Zener diodes 23 and 24 and resistor 31 are thus selected to limit solion input currents to 1.2 ma. when a large step voltage is applied to FUNCTION GENERATOR 9. For example, a value of 4.7K may be selected for resistor 31 thus providing INTEGRATOR 10 with an input resistance of about 5K, the input resistance of solion 14 being approximately 300 ohms. Zener diodes 23 and 24 may then be selected to limit the input potential applied to FUNCTION GENERATOR 9 to ±6 volts. Thus, the maximum voltage that could be applied to INTEGRATOR 10 would be ±6 volts. It will thus be appreciated that, since the maximum input current which could be applied to the solion when the controller is in its AUTOMATIC mode would be 1.2 milliamperes, no surge can occur at the readout electrode 17.

Bleeder resistor 32 provides means to compensate for the variation in back EMF appearing between input electrode 19 and common electrode 16 over the operating range of the solion by placing a fixed negative bias on common electrode 16. This bias is chosen to be equal in value and opposite in polarity to the back EMF at the middle of the controller's range of operation in order to minimize its effect over the entire range of the controller. A bias voltage of the order of −.01 v., which is normally suitable for this purpose, may be provided by resistor 32.

Output current 22 of INTEGRATOR 10, which is proportional to the error signal current, may then be amplified in a conventional manner by AMPLIFIER 13 which comprises transistors 40 and 42. The amplified output current flowing in the collector circuit of transistor 42 will be applied to the load connected to DIRECT OUTPUT terminals 43. If the process load current is to vary between 10 and 50 milliamperes, while amplifier input current 22 varies from .5 to .9 milliampere, it can be seen that an amplifier gain of 100 is required.

Transistor 49, which shares emitter resistor 44 with transistor 42, provides a convenient method of obtaining not only a reverse acting output signal at REVERSE OUTPUT terminals 45, but it also provides a convenient method for obtaining a negative feedback signal to stabilize the amplifier. This signal, which is developed across resistor 46, is applied to the input of the amplifier through the negative feedback network comprising negative temperature coefficient resistor 47 and resistor 48. Negative temperature coefficient resistor 47 is provided to compensate for variations in output current 22 with temperature variations.

To summarize the action of the controller when MODE CONTROL switch 30 is in its AUTOMATIC position, the presence of an error signal current at the input of FUNCTION GENERATOR 9 will result in the application of a current to INTEGRATOR 10 of the correct polarity to cause the output current 22 to move in the correct direction to reduce the error signal. For example, assuming that the output current of TRANSMITTER 11 is larger than the set point current, a portion of the resulting difference current will flow through FUNCTION GENERATOR 9 and INTEGRATOR 10. This resulting in the addition of current to input electrode 19 which causes output current 22 to decrease. Thus, assuming that the process load is connected to DIRECT OUTPUT terminals 43 and a dummy load is connected to REVERSE OUTPUT terminals 45, process load current will decrease causing the current flowing in TRANSMITTER 11 to decrease in order to reduce the input error current to the controller. Of course, it will be recognized that if the process load is connected to REVERSE OUTPUT terminals 45, the load current will increase causing the current of TRANSMITTER 11 to decrease.

In accordance with the invention, a second mode of controller operation is provided when MODE CONTROL switch 30 assumes its intermediate position. When the switch assumes this position, the input of INTEGRATOR 10 is connected to MANUAL CONTROL A by switch section 30a thus permitting direct control of INTEGRATOR 10 by a signals from this source. However, this intermediate position may also be utilized to perform a balancing operation preparatory to actuating MODE CONTROL 30 to its third position, i.e., MANUAL B position. Therefore, this intermediate position is designated BALANCE/MANUAL A.

MANUAL CONTROL A, which comprises spring-biased switch 50, is operable from its normal unoperated condition to either a first or a second condition for selectively providing at its output either a positive or a negative potential, respectively. It has been found that when MANUAL CONTROL A provides a potential of the order of ±.1 v. on the input of INTEGRATOR 10 desirable manual control characteristics are obtained.

It will be appreciated that the output of MANUAL CONTROL A will be unenergized when switch 50 is in its normal operating condition. Thus, whenever MODE CONTROL switch 30 is operated from its AUTOMATIC to its BALANCE/MANUAL A position, no signal will be applied to the input of INTEGRATOR 10 as long as switch 50 is at that time in its normal unoperated condition.

Means is provided by switch section 30b to ground the output of FUNCTION GENERATOR 9 so that the output will be at ground potential whenever MODE CONTROL switch 30 is returned to its AUTOMATIC position thus effectuating this transfer in a bumpless manner. This means that transfers in either direction between AUTOMATIC and BALANCE/MANUAL A modes will be accomplished without introducing a bump in the process load current since both controller outputs remain connected to the output of INTEGRATOR 10 while this switching is taking place. Consequently, the controller is self-synchronized when transferring between these modes of operation thus permitting such transfers to take place under automatic control.

In accordance with the invention, INPUT CONTROL circuit 60, which is coupled to the current flowing in the circuit connected to DIRECT OUTPUT terminals 43, is provided to prevent reset windup when the controller is in its AUTOMATIC mode. In addition, INPUT CONTROL 60 also protects INTEGRATOR 10 from accidental attempts to cause the controller output current to assume a value outside of the desired range of current values when the controller is in its MANUAL A mode of operation. For example, INPUT CONTROL 60 will prevent the controller output current from assuming values more than a few milliamperes outside the 10–50 ma. range. This control, which becomes operative only when the output current is outside this range, is provided by feeding back current over conductor 61 upon the selective operation of diodes 62 and 63. Diode 62 will conduct whenever the output falls more than a few milliamperes below the desired minimum of 10 ma. while diode 63 will conduct when the current exceeds, by a few milliamperes, the desired maximum of 50 ma.

Control of the forward bias on diodes 62 and 63, in accordance with the current flowing in the DIRECT OUTPUT circuit, is obtained by coupling these oppositely polarized diodes to opposite terminals of Zener diode 69 which is connected in series with resistors 68 and 70 between points D and C. Zener diode 66, which is connected in series with resistor 67 between conductor 29 and B+, causes point D to assume a fixed, positive potential with respect to conductor 29; while the potential of point C, which is negative with respect to conductor 29, will vary in accordance with the drop across resistor 64.

As was previously indicated, the potential of input electrode 19 is under normal conditions very near ground potential. Thus, if point B goes positive, a forward bias will be placed on diode 63. This condition will obtain whenever the current flowing in resistor 64 exceeds 50 ma. Under such conditions, diode 63 will conduct and add current to input electrode 19 to cause the output to return to approximately 50 ma. at which point it will cease conducting. If, however, current flowing in a direction calling for a larger output current continues to be applied through resistors 31 and 32 at a time when the output already exceeds 50 ma., diode 63 must also shunt this input current from the input of INTEGRATOR 10 to protect the solion; and, in addition, it must supply enough additional current to the input of the solion so that the readout current, and ultimately the current in resistor 64, will decrease. This requires that the resistance of diode 63 and resistor 70 be low enough to supply currents of such magnitude when the DIRECT OUTPUT current exceeds 50 ma. It can be seen that if current calling for larger DIRECT OUTPUT currents continues to be applied to the input of INTEGRATOR 10, an oscillatory condition will exist until such input current ceases or reverses direction. However, this oscillatory condition is not detrimental to proper controller operation since it occurs outside the range of controller operation.

Diode 62 performs a like function with respect to the lower limit of the range of desired output current values by conducting whenever the potential of point A goes negative with respect to input electrode 19. Whenever it does so, it will take current from the input of solion 14 to increase the readout current until the controller output current again approaches 10 ma.

Potentiometer 80 of INPUT CONTROL 60 provides an alternate means for manually controlling the outputs of the controller. This control, which will hereinafter be referred to as MANUAL CONTROL B, may be more desirable than MANUAL CONTROL A in those applications in which the controller is to be left on manual for indefinite or extended periods of time. In such a case, MANUAL CONTROL A might not be suitable if control within very tight limits were desired and the controller were to be left unattended, since there tends to be a slight long-term drift in the output of the controller when the input of the solion is open-circuited. This is due to the slight long-term drift in solion readout current. However, unattended long-term manual control may be obtained when MOD CONTROL 30 is placed in its MANUAL B position since the signal applied to the input of INTEGRATOR 10 is fed back from the DIRECT OUTPUT circuit through INPUT CONTROL 60. This feedback signal, which appears on the slider of potentiometer 80, is of the correct phase to cause the output currents to assume and hold any value in the range of 10–50 ma. This is accomplished since the feedback signal applied to INTEGRATOR 10 via conductor 82 causes the output of the controller to assume a value which will reduce the feedback signal to zero; i.e., reduce the potential of conductor 82 to ground. If, however, the readout current of the solion tends to drift, a signal will be fed back which will drive the output back to the desired value.

Bumpless transfer to MANUAL CONTROL B may be accomplished by balancing the controller, when the controller is in its MANUAL/BALANCE A mode, by operating potentiometer 80 until its slider is at ground potential. Error signal indicator 81, which is selectively connected in parallel with resistor 28 to indicate the magnitude of the error signal applied to the input of FUNCTION GENERATOR 9 when the controller is in its AUTOMATIC or MANUAL A modes, provides means for indicating when the potential of conductor 82 is at ground potential. After this balancing operation is completed, MODE CONTROL switch 30 may be placed in its MANUAL B position without applying current to input electrode 19. However, once the MODE CONTROL switch is in its MANUAL B position, the output currents may be placed at any point within a range of output values by adjusting potentiometer 80.

To summarize, INPUT CONTROL 60 prevents reset windup when the controller is in its AUTOMATIC mode and prevents the controller from saturating when the controller is in its MANUAL A mode of operation. In addition, INPUT CONTROL 60 provides control signals which permit the controller output currents to be set at any value between 10 and 50 ma. when the controller is in its MANUAL B mode of operation. It will be recognized that since MANUAL A and MANUAL B modes are described as being alternative modes of operation either one of these modes may be eliminated without affecting the remaining manual mode by dispensing with the corresponding control device.

While there has been described what is at present considered to be a preferred embodiment of the invention, it will be apparent to those skilled in the art that various changes and modifications may be made therein without departing from the spirit or scope of the invention.

What I claim as new and desire to secure by Letters Patent of the United States is:

1. In a process controller for controlling the energization of a process load including error signal means having output terminals adapted to be energized by a current proportional to a measured variable and a current proportional to a desired set point, the error signal means generating a current equal to the difference of the measured variable and set point currents, the improvement of means for controlling the process load energization so the measured variable and set point are equal comprising:

(a) a derivative function generator having input and output terminals, said function generator input terminals being connected to said error signal means output terminals, said function generator thereby being energized by the difference current, (b) an electrochemical cell having input and output terminal means for providing a signal at said cell output terminals proportional to the integral of signals applied to said cell input terminal means, said cell output terminal means being adapted for connection to the process load, and (c) means for selectively connecting said cell input terminal means to said function generator output terminals.

2. A process controller as recited in claim 1 additionally comprising means shunting said function generator to limit signal excursions to a given value to prevent a signal at said function generator output terminals from overdriving said electrochemical cell.

3. A process controller as recited in claim 2, said shunting means comprising first and second oppositely polarized diodes in series across said function generator input terminals.

4. A process controller as recited in claim 3, wherein said cell input and output terminal means are coupled to an input electrode, an output electrode and a common electrode in said cell, said function generator output terminals being connected by said input terminal means to said input and common electrodes, said controller additionally comprising capacitive coupling means for interconnecting said function generator input and output terminals, said direct connecting means comprising input current limiting means in series with said input and common electrodes operative when the voltage thereacross is equal to said given value.

5. A process controller as recited in claim 4 additionally comprising constant minimum bias current generating means connected between said output and common electrodes for controlling the maximum value of input current which said cell can accept and integrate.

6. A process controller as recited in claim 5, said minimum bias current generating means comprising a negative temperature coefficient resistor for maintaining said bias current substantially constant with changes in ambient temperature.

7. A process controller as recited in claim 6 additionally comprising amplifier means having input terminals and output terminals, said amplifier output terminals adapted for connection to the process load and said amplifier input terminals connected to said cell output terminal means, said amplifying means having negative feedback circuit means having a negative temperature coefficient to compensate for the change in value of signal output current with temperature changes.

8. A process controller as recited in claim 7, additionally comprising means connected between said input and common electrodes for preventing the voltage therebetween from exceeding a potential which would damage said cell, said cell further comprising a shield electrode and said process controller additionally comprising means for negatively biasing said shield electrode with respect to said input electrode for proper operation of said cell.

9. A process controller as recited in claim 1, additionally comprising amplifying means having input and output terminals, said output terminals being adapted for connection to the process load and said amplifier input terminals being connected to said electrochemical cell output terminal means, adjustable means coupled to said amplifying means output terminals for selectively generating control signals lying within a given range of voltage values, and means capable of assuming a plurality of conditions, said means selectively assuming first and second conditions for selectively connecting said electrochemical cell input electrode to either said function generator output terminals or said adjustable control signal generating means output terminals to permit selection of different operating modes, said range of voltage values from said adjustable control signal generating means being related to said reference potential to cause the output current applied to the process load to assume and hold any desired value within said given range of output voltage values.

10. A process controller as recited in claim 9, said selective connecting means having a third condition during switching from said first to said second condition, said selective connecting means connecting the output of said control signal generating means to said fixed reference potential through a current indicating device in said third condition whereby an indication is obtained to aid in adjusting said control signal generator until its output is at said fixed reference potential to thereby prevent the occurrence of a bump in the output current by assuring that the control signal will be zero when said control signal generating means is initially connected to the input of said cell.

11. A process controller as recited in claim 10, wherein said control signal generating means includes a potentiometer including a resistor and a slider, said resistor being connected between a point in the output circuit of said amplifying means that varies in potential in response to output current flow and a fixed potential, said slider constituting output terminal means of said control signal generating means, and means shunting said resistor portion of said potentiometer for maintaining the voltage thereacross substantially constant over said desired range of output current values.

12. A process controller as recited in claim 11, additionally comprising first and second unidirectional conductive devices connected between said input electrode and opposite ends of said potentiometer, ecah of said directional conductive devices being biased so as to be nonconductive once said output current falls within said range of values, said unidirectional devices feeding current back to said input electrode when said output current falls outside said desired range of output current values, said function generating means generating a reset function and said feedback current being of a proper polarity to cause the output signals of said cell to vary in a direction which tends to bring said output currents back within said range to prevent reset windup.

References Cited
UNITED STATES PATENTS

| | | | |
|---|---|---|---|
| 3,211,968 | 10/1965 | Grams et al. | 317—231 |
| 3,223,639 | 12/1965 | Powers | 317—231 |
| 3,069,554 | 12/1962 | Decker et al. | 307—64 |
| 3,214,660 | 10/1965 | Smoot | 318—28 |
| 3,219,936 | 11/1965 | Eksten et al. | 318—28 |
| 3,246,250 | 4/1966 | Nazareth | 330—10 |
| 3,290,562 | 12/1966 | Faulkner et al. | 317—231 |
| 3,290,563 | 12/1966 | Hyer et al. | 317—231 |

MALCOLM A. MORRISON, *Primary Examiner.*

MARTIN P. HARTMAN, *Examiner.*